Aug. 27, 1968  E. L. ECKFELDT  3,399,037
METHODS AND SYSTEMS FOR DETERMINING THE SOLUTE
CONCENTRATION OF DILUTE AQUEOUS SOLUTIONS
Filed Sept. 20, 1963  7 Sheets-Sheet 1

Aug. 27, 1968 E. L. ECKFELDT 3,399,037
METHODS AND SYSTEMS FOR DETERMINING THE SOLUTE
CONCENTRATION OF DILUTE AQUEOUS SOLUTIONS
Filed Sept. 20, 1963 7 Sheets-Sheet 4

Aug. 27, 1968         E. L. ECKFELDT         3,399,037
METHODS AND SYSTEMS FOR DETERMINING THE SOLUTE
CONCENTRATION OF DILUTE AQUEOUS SOLUTIONS
Filed Sept. 20, 1963         7 Sheets-Sheet 6

United States Patent Office 3,399,037
Patented Aug. 27, 1968

3,399,037
METHODS AND SYSTEMS FOR DETERMINING THE SOLUTE CONCENTRATION OF DILUTE AQUEOUS SOLUTIONS
Edgar L. Eckfeldt, Ambler, Pa., assignor to Leeds & Northrup Company, a corporation of Pennsylvania
Filed Sept. 20, 1963, Ser. No. 310,310
20 Claims. (Cl. 23—230)

ABSTRACT OF THE DISCLOSURE

Determination of solute concentration of dilute aqueous solutions by measurement of conductivity, making use of the calculated ionization/temperature characteristic of theoretically pure water. Monitoring the salt concentration of an aqueous solution, using such determination.

---

This invention relates to methods and systems in which the solute concentration of aqueous solutions is determined by electrolytic conductivity measurements.

For previously unaccountable reasons, such methods and systems have failed to provide a predictable correlation between solution conductivity and solute concentration when the speciffic conductivity of the solution was of the order of 1 micromho per centimeter or less. In consequence, users of processes and systems requiring water of high purity have heretofore criticized conductivity measurements as unsuited for their purposes despite the speed and convenience of such measurements as contrasted with chemical analyses.

It has now been determined from studies concerned with the present invention that the conductivity of all aqueous solutions of low impurity concentration is greatly influenced by ionization of the solvent, i.e., water. Specifically, for neutral solutions, the ionization of the solvent increases as a rapidly rising non-linear function of solution temperature with the conductivity contribution of the solvent greatly exceeding the conductivity contribution of the solute at higher temperatures. Furthermore, for strong acid or base solutions, the solution conductance is additionally significantly affected by a "common-ion" effect which is a non-linear function of both solution temperature and solution concentration. When an appreciable quantity of a common ion type of impurity is present in solution at elevated temperature, the repression of solvent ionization through the common ion effect is a significant factor in determining net solution conductance. However, with the same amount of impurity but at low solution temperature, the proportionate influence of the common ion factor is minor because the extent of solvent ionization at low temperature is always small and overshadowed by the conductance contribution directly due to the impurity ions.

All of the foregoing effects, distinct from and in addition to the tendency of the solution conductivity to increase as a linear function of temperature because of solute ion contribution, have heretofore been unrecognized as responsible for the vagaries and ambiguities of conductivity measurements as heretofore made on dilute aqueous solutions, i.e., solutions whose impurity or solute concentration lies within the range of zero to about $10^{-5}$ molar.

In accordance with the present invention, the solution conductance as indicated by a meter responsive to flow of current through a conductivity cell is converted to a difference-conductance reading by subtraction of the solvent-ion contribution from solution conductance at the existing solution temperature. Such conversion and in terms of the difference-conductance at a reference temperature is automatically effected by producing flow of a second current through resistance means subject to the solution temperature and whose resistance varies non-linearly with temperature in accordance with the calculated ionization/temperature characteristic of theoretically pure water (i.e. $H_2O$ absent any impurity ions), the two currents flowing in opposite or subtractive directions through a measurement means associated with the meter. For salt solutions or for weak acid or base solutions, the difference-conductance is converted to solute conductance at a reference temperature, or optionally to solute concentration, by applying a correction of about 2% per degree C. Such correction is automatically effected by exposing a measuring resistance means, or a suitable part of it, to the solution temperature and selecting for it a temperature-coefficient which compensates for the temperature change of the solute ions. In situations where the solution is known or suspected to include strong acid or base-forming impurities, the solution may be treated to convert the acid or base to the corresponding neutral salt prior to the conductivity measurement. As an alternative to such acid or base conversion, as well as in cases where it is desired to measure the concentration of a strong acid or base in dilute aqueous solution, the solution conductance is first corrected for water ionization, as above explained, as though the conductivity of the solvent actually had the same rapidly rising temperature-coefficient of theoretically pure water and the residual error, due to the common-ion effect, is reduced by applying to the difference-conductance a correction related both to the temperature of the solution and its concentration. Although such residual error may be automatically reduced with either a linear or non-linear type of ohmmeter circuit, by judicious selection of the temperature coefficient of the measuring resistance means with respect to the average temperature coefficient of solutions of different concentration within the range here of interest, a better match for the composite effect of temperature and concentration upon the solution conductance is obtainable with the non-linear ohmeter circuit.

The invention further resides in conductivity measuring methods and systems having features of novelty and utility hereinafter described and claimed.

For a more complete understanding of the invention, reference is made in the following discussion and description of methods and apparatus embodying it to the attached drawings in which.

In efforts to determine whether or not it was possible to devise methods and systems providing a predictable correlation between the conductivity of dilute aqueous solutions and their solute-concentration, there was conducted a basic study to ascertain whether there existed any reproducible factor, or combination of factors, responsible for the unpredictable behavior of the conductivity of dilute solutions. In absence of empirical equations or reliable data concerning dilute solutions having specific conductivity in the range of about 1 micromho per centimeter and less, the conductance of various dilute solutions of typical salts, acids and alkalies was calculated at various temperatures from 0° C. to 100° C. These calculations involved determination of the ionization constant of theoretically pure water from computations based on the free energy change of the water ions, the limiting ionic conductance values of ions of typical salts, acids and bases and the effect of a common-ion upon the ionization equilibrium of water. The calculated conductance values are listed in Table A below:

TABLE A.—SPECIFIC CONDUCTANCE VALUES FOR WATER AND DILUTE SOLUTIONS AT VARIOUS TEMPERATURES IN MICROMHOS PER CENTIMETER

| Solution Composition | | Temperature, ° C. | | | | |
|---|---|---|---|---|---|---|
| Compound | Microequivalents per liter at 25° C. | 0 | 25 | 50 | 75 | 100 |
| Pure Water | | 0.01112 | 0.05518 | 0.1741 | 0.4086 | 0.7694 |
| NaCl | 0.5 | 0.045 | 0.118 | 0.271 | 0.541 | 0.937 |
| | 1.0 | 0.079 | 0.181 | 0.369 | 0.676 | 1.108 |
| | 2.0 | 0.146 | 0.308 | 0.565 | 0.946 | 1.451 |
| | 4.0 | 0.282 | 0.561 | 0.958 | 1.485 | 2.138 |
| | 6.0 | 0.417 | 0.814 | 1.350 | 2.025 | 2.824 |
| | 8.0 | 0.553 | 1.067 | 1.743 | 2.565 | 3.510 |
| | 20.0 | 1.365 | 2.584 | 4.097 | 5.803 | 7.628 |
| $Na_2SO_4$ | 0.5 | 0.0450 | 0.120 | 0.278 | 0.557 | 0.964 |
| | 1.0 | 0.0788 | 0.185 | 0.382 | 0.705 | 1.159 |
| | 2.0 | 0.147 | 0.315 | 0.590 | 1.001 | 1.548 |
| | 4.0 | 0.282 | 0.576 | 1.007 | 1.594 | 2.326 |
| | 6.0 | 0.417 | 0.836 | 1.423 | 2.187 | 3.105 |
| | 8.0 | 0.553 | 1.100 | 1.839 | 2.779 | 3.883 |
| | 20.0 | 1.365 | 2.657 | 4.336 | 6.334 | 8.555 |
| HCl | 0.2 | 0.055 | 0.108 | 0.229 | 0.468 | 0.834 |
| | 0.5 | 0.134 | 0.223 | 0.355 | 0.589 | 0.953 |
| | 1.0 | 0.266 | 0.430 | 0.612 | 0.857 | 1.212 |
| | 2.0 | 0.532 | 0.852 | 1.166 | 1.485 | 1.861 |
| | 8.0 | 2.128 | 3.399 | 4.584 | 5.629 | 6.531 |
| NaOH | 0.2 | 0.0282 | 0.0726 | 0.188 | 0.423 | 0.787 |
| | 0.5 | 0.0665 | 0.135 | 0.250 | 0.476 | 0.834 |
| | 1.0 | 0.132 | 0.253 | 0.402 | 0.630 | 0.969 |
| | 2.0 | 0.263 | 0.499 | 0.747 | 1.034 | 1.393 |
| | 8.0 | 1.052 | 1.985 | 2.912 | 3.815 | 4.637 |

Figure 1:
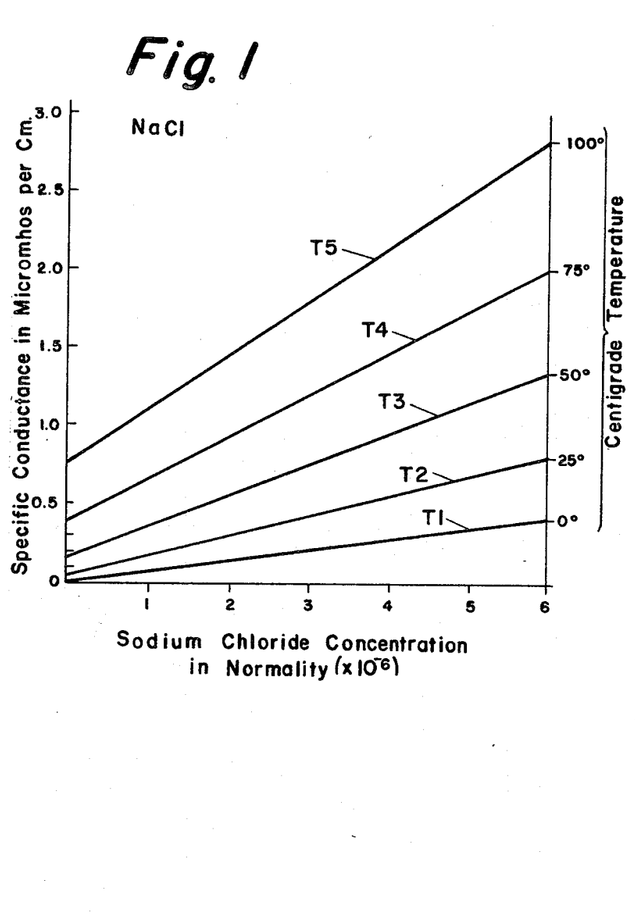
FIG. 1 is an explanatory figure showing, for salt solutions, a family of conductance/concentration curves each for a different solution temperature.

As shown by any of curves T1 to T5 of FIG. 1, plotted from salt solution data of Table A, for any given solution-temperature, the relationship between specific conductance of the solution and the concentration of the solute, specifically sodium chloride, is a substantially linear one with the conductance increasing with increase of concentration. However, the rate at which the solution conductance increases is different for different solution temperatures and is increasingly higher for higher temperatures so that a given specific conductance of the solution is not indicative of a particular salt concentration.

Figure 2:
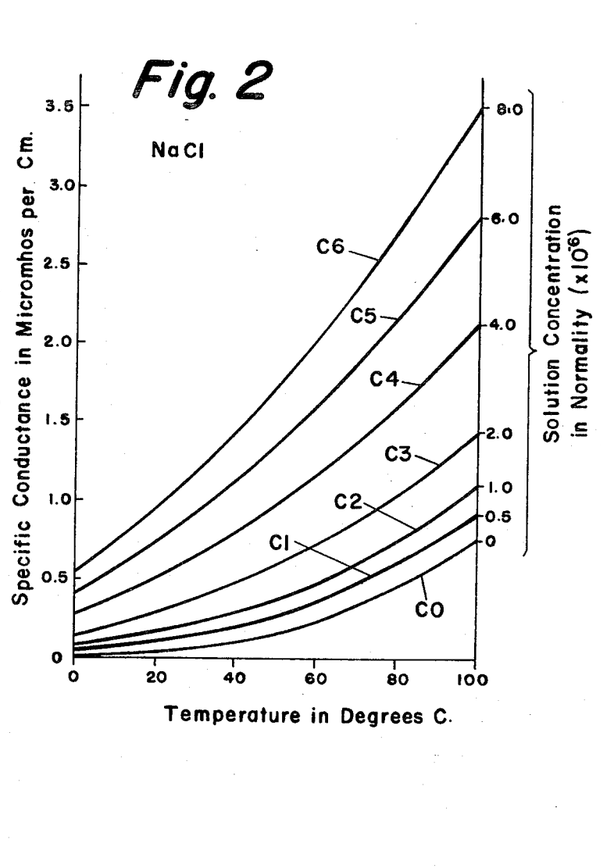
FIG. 2 is an explanatory figure showing, for salt solutions, a family of conductance/temperature curves, each for a different salt concentration.

As shown by curves C0 to C6 of FIG. 2, for any given concentration of the dilute salt solution, the relationship between the specific conductance of the solution and the solution temperature is a non-linear one with the conductance rapidly increasing with increase of temperature. The non-linearity becomes greater with decrease of concentration of the solution.

Having in mind that the electrolytic conductivity of a solution is due to presence of positively and negatively charged ions, it now becomes clear that in very dilute aqueous solutions the conductance contribution of the solvent ions ($H^+$, $OH^-$) is most significant and particularly at the higher solution temperatures substantially exceeds, by several hundred percent, the conductance contribution of the solute.

It is also now clear that temperature has two distinctly different effects upon the conductance of dilute solutions: a strongly non-linear effect determined by the total number of ions which are present and a more nearly linear effect dependent upon the mobility of the ions as determined primarily by the changing viscosity of the solvent, i.e., water. As the concentration approaches that of pure water, the number of ions present is largely determined by the ionization constant of water and the temperature-coefficient of the solution is high, very non-linear and significantly affected by the temperature-sensitive ionization equilibrium of the hydrogen and hydroxyl ions of the water. For larger and larger amounts of ionizable impurity (sodium chloride in the particular instance), the temperature-coefficient becomes smaller and less non-linear until for a concentration corresponding with about 1 micromho per centimeter at 25° C., further increase in the salt concentration causes very little further change in the temperature coefficient. At that region and beyond, the temperature-coefficient becomes nearly constant at about 2% per degree C., and is principally due to the temperature-sensitive mobility of the total number of ions present per unit volume of water.

Figure 3:
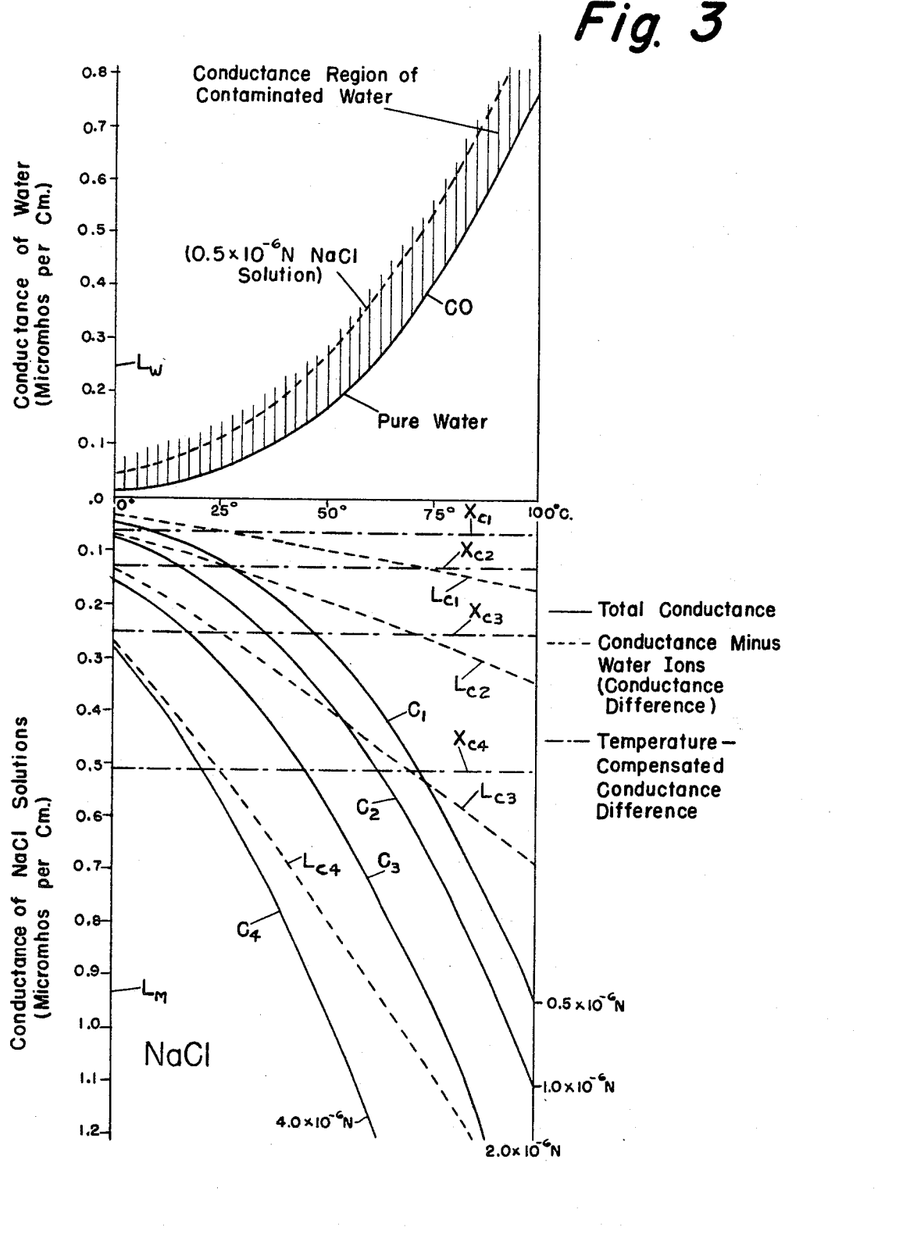
FIG. 3 is an explanatory figure referred to in discussion of compensation for the effects of solution temperature upon conductance due to ionization of the solvent and upon conductance due to concentration of the solute.

Referring now to FIG. 3, the conductivity curve C0 for theoretically pure water is plotted against the upper conductance scale $L_W$ and the salt conductivity curves C1 to C4 of FIG. 2 are inverted and plotted against the lower conductance scale $L_M$. The two equal but opposite scales $L_W$ and $L_M$ are expanded with respect to the conductivity scale of FIG. 2, more clearly to show the rapid non-linear rise with temperature of conductance in the region from 0 to about 1.0 micromho per centimeter.

In FIG. 3, each of the curves $L_{C1}$ to $L_{C4}$ is plotted by subtracting the theoretically pure water conductance curve C0 from the corresponding one of the total-conductance curves C1 and C4 so that it represents that portion of the solution conductance which is due to the salt impurity ions ($Na^+$ $Cl^-$) alone. Comparison of each pair of curves, i.e., C1 vs. $L_{C1}$, C2 vs. $L_{C2}$, etc. shows the rapid increase with temperature of the masking effect of water ionization upon the conductance due to the salt impurity ions. For example, at a solution temperature of 100° C., the total conductance of a 0.5 molar solution is 0.937 micromho per centimeter (curve C1), but of this only 0.168 micromho per centimeter is due to the salt impurity ions in contrast to the 0.796 micromho per centimeter due to the hydrogen and hydroxyl ions. For this example, the solution conductance, as a measure of salt concentration, is in error by more than 500 percent.

Also from comparison of the total conductance curves C1 to C4 with the difference-conductance curves $L_{C1}$ to $L_{C4}$, it is evident that the difference conductance of the solution, as distinguished from the total conductance, increases linearly in proportion to the salt concentration for any given temperature. For example, the 75 degree points of curves $L_{C1}$ to $L_{C4}$ shows that each doubling of the salt concentration results in doubling of the difference conductance whereas the 75 degree points of total-conductance curves C1 to C3 show that each doubling of the salt concentration results in a relatively small and varying percentage change of the solution conductance. In short, the difference-conductance measurements are more sensitive than the total conductance measurements to changes in solution concentration and the meter scale as calibrated for difference-conductance may be linear or uniform in terms of salt concentration at a substantially constant measurement temperature.

Since in most industrial processes the solution temperature varies over a substantial range, the difference-conductance, or impurity readings, should be corrected for the difference in temperature between the actual solution temperature and a preselected fixed or reference temperature. For example, for the selected reference temperature of 25° C. (Table A), the difference-conductance of the 0, .5, 1, 2 and 4 micronormal salt solutions changes quite uniformly at the rate of about 2% per degree C. Consequently, if this temperature correction is applied to the difference-conductance (curves $L_{C1}$ to $L_{C4}$) as measured at the existing solution temperature, the corrected difference-conductance (see curves $X_{C1}$ to $X_{C4}$) becomes independent of the measurement temperature and corresponds to a 25° C. reference temperature. The corrected difference-conductance value becomes a direct measure of the impurity ion concentration which likewise is independent of measurement temperature.

Dilute aqueous solutions of salts other than sodium chloride (for example, sodium sulphate—Table A) exhibit very closely similar relationships between solution-conductance and solute-concentration so that the same method may be used to determine the difference-conductance and to apply thereto a substantially linear temperature correction of about 2% per degree C. for any difference between the solution temperature and a selected reference temperature.

Circuit arrangements for automatically effecting temperature compensation for the ionization of the solvent and for the solute are later herein described.

Determining a predictable correlation between solution-conductance and solute-concentration is even more complicated when the impurity is an acid or a base rather than a salt. The need for determining the salt concentration of dilute solutions containing acid or base-forming materials arises, for example, when anti-corrodants, such as ammonia or amines, are added to boiler water. The added ammonia or amines cause an increase of the electrolytic conductivity of the water and so render a conductivity measurement ambiguous so far as determination of the amount of salt ions present. The selective removal of the ammonia and amines by a cation exchange column in advance of the conductivity cell converts the impurity ions originally present as salts into impurity ions of the corresponding acids. By comparison of FIG. 4 with FIG. 1 and of FIG. 5 with FIG. 2, it clearly appears that the relationships between solution-conductance, impurity-concentration and temperature are quite different for acid and salt solutions. The curves of FIGS. 4 and 5 are plotted from the hydrochloric acid data of Table A whereas, as above stated, the corresponding curves of FIGS. 1 and 2 are plotted from the sodium chloride data of Table A.

Figure 4:
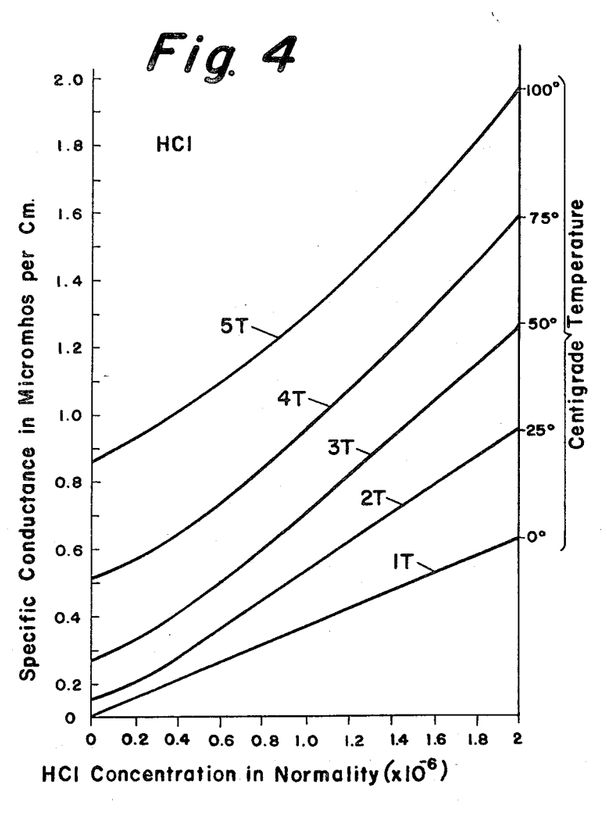
FIG. 4 is an explanatory figure showing, for acid solutions, a family of conductance/concentration curves, each for a different solution temperature.

More specifically, the curves 1T to 5T of FIG. 4 which show the relationship between solution-conductance and impurity-concentration at different solution temperatures are all quite linear only for concentrations above about $1 \times 10^{-6}$ normal. For lower concentrations, the increase of conductance with increase of concentration varies from an almost linear rate for a solution temperature of 0 degrees C. to various non-linear rates for higher solution temperatures.

Figure 5:
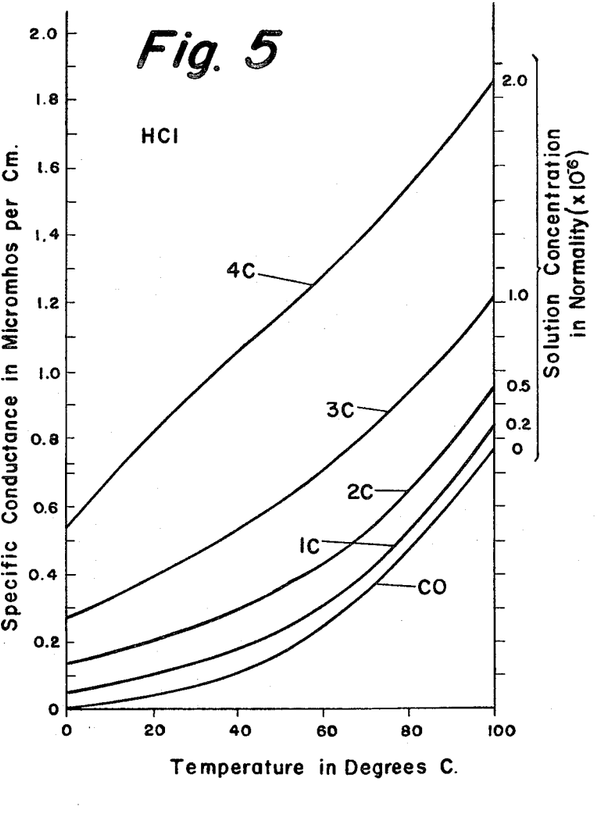
FIG. 5 is an explanatory figure showing, for acid solutions, a family of conductance/temperature curves each for a different acid concentration.

As shown by curves 1C to 4C of FIG. 5, the effect of temperature upon solution-conductance differs markedly for solutions of different acid concentration. Above about 50° C, the curves are generally similar in that the rate of rise increases with increase of temperature although less with increase in concentration. At temperatures below 50° C, the curvature is concave upward with increase of concentrations up to about $1 \times 10^{-6}$ normal and then for higher concentrations becomes concave downward.

It has been determined that the significant differences between the joint effects of temperature and concentration upon the conductance/concentration characteristics of acid or base solutions as compared to their effects upon the conductance/concentration characteristics of salt solutions are due to a common-ion effect which in strong acid or strong base solutions has two significant effects now discussed.

In a dilute salt solution, the impurity ions have no significant effect on the equilibrium equation of the water ions which may be written as (1)  $HOH \rightleftharpoons H^+ + OH^-$ The conductivity component arising from the water ions ($H^+$ and $OH^-$) remains the same regardless of the presence or absence of salts such as sodium chloride, sodium sulphate and the like.

However, when the impurity is a strong acid such as hydrochloric acid or a strong base such as sodium hydroxide, there is interaction between the ion from the water equilibrium and the hydrogen ion in the case of a strong acid or the hydroxyl ion in the case of a strong base.

When, for example, hydrochloric acid is the impurity, the equilibrium equation can be written as (2)  $H^+ + Cl^- + HOH \rightleftharpoons H^+ + Cl^- + H^+ + OH^-$ The hydrogen ions from the acid, appearing on both sides of the equilibrium equation, have the effect of repressing ionization of the water.

When, for example, sodium hydroxide is the impurity, the equilibrium equation can be written as (3)  $Na^+ + OH^- + HOH \rightleftharpoons Na^+ + OH^- + H^+ + OH^-$ The hydroxyl ions from the base, appearing on both sides of the equilibrium equation, have the effect of repressing ionization of the water.

Figure 6:
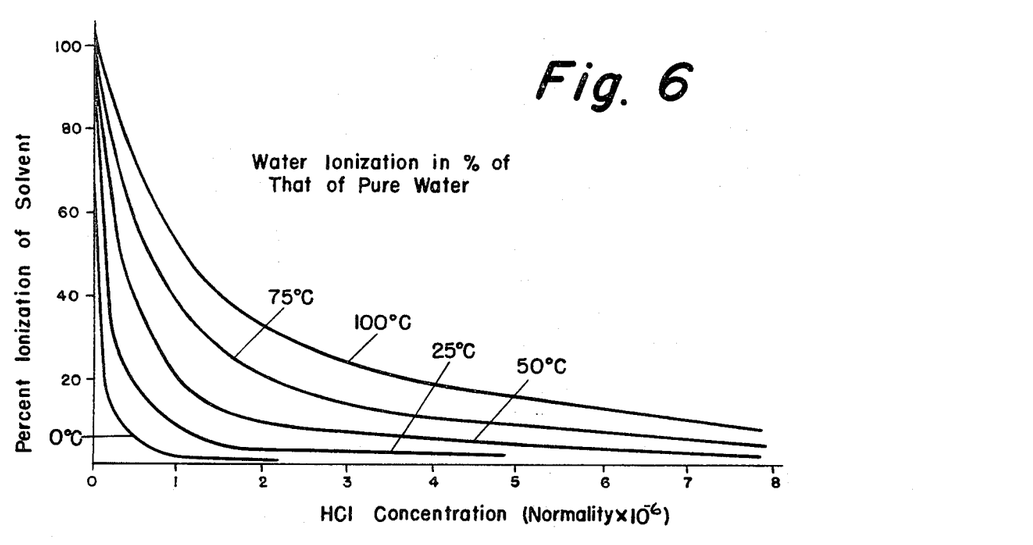
FIG. 6 is an explanatory figure showing, for acid solutions, the repressive effect of a common ion upon ionization of the solvent at different solution temperatures and concentrations.

As shown in FIG. 6 by the concentration/percent solvent ionization curves at different temperatures, the repressive action of a common-ion upon the water ionization is a non-linear function both of solution temperature and of the acid or base concentration. These curves show that the common-ion effect has a significant effect upon the extent of water ionization in dilute solutions at all temperatures and is particularly marked for the lower concentrations where pure water exhibits only a small tendency to ionize.

Figure 7:
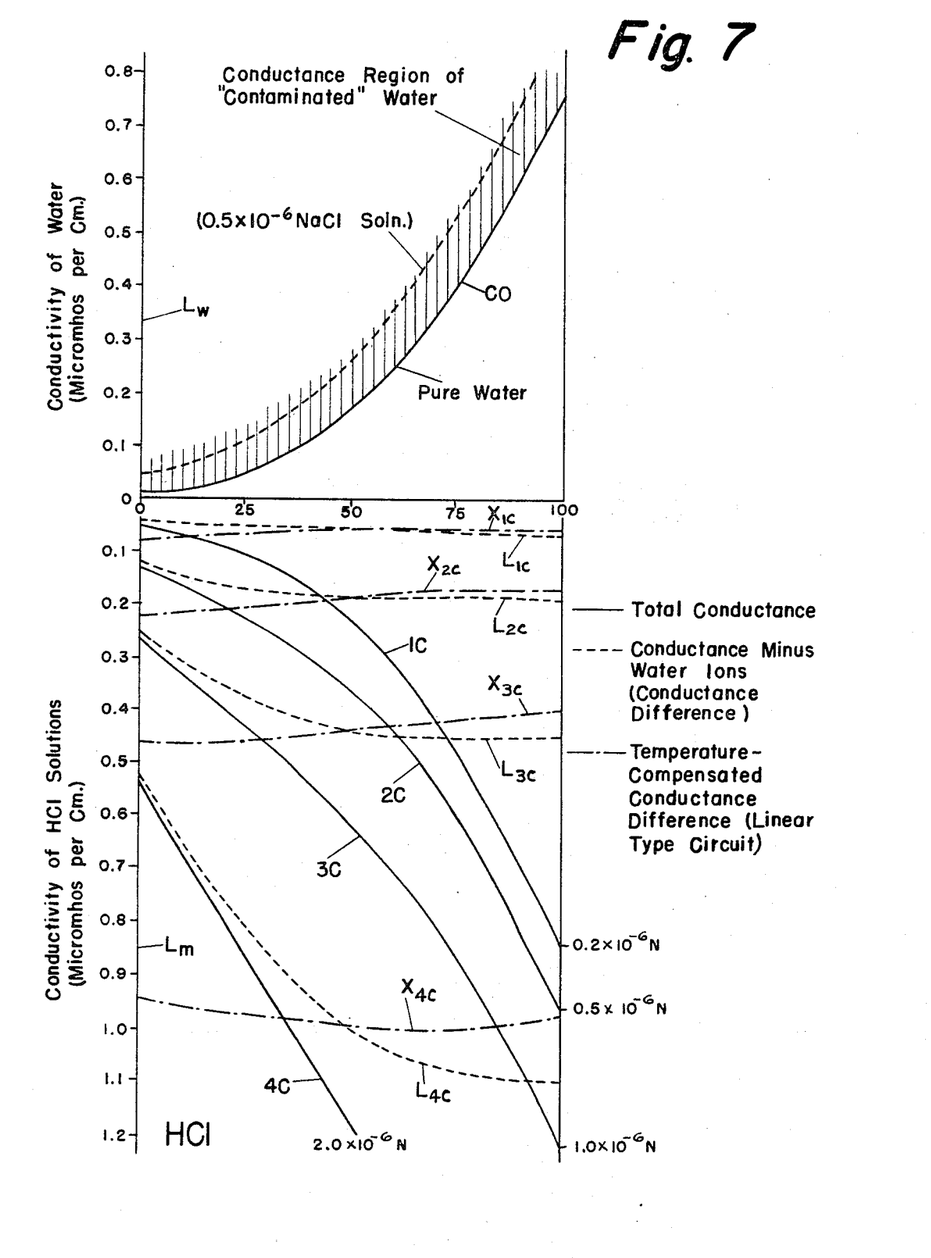
FIG. 7 is an explanatory figure referred to in discussion of compensation for the effects of solution and temperature upon conductance due to ionization of the solvent as repressed by the common ion effect and upon conductance due to the common-ion effect and concentration of the solute.

Referring now to FIG. 7, the conductivity curve C0 of theoretically pure water is plotted against the upper conductance scale $L_W$ and the acid conductivity curves 1C to 4C of FIG. 5 are inverted and plotted against the lower conductance scale $L_M$. Each of the curves $L_{1C}$ to $L_{4C}$ is plotted by subtracting the pure-water conductance curve C0 from the corresponding one of the total conductance curves 1C to 4C. Comparison of each pair of curves 1C vs. $L_{1C}$, 2C vs. $L_{2C}$ and 3C vs. $L_{3C}$ shows that for temperatures above about 50° C., the difference-conductance for the more dilute solutions changes to relatively small extent with temperature. Otherwise stated, for this range of higher temperatures, the common-ion effect substantially reduces or neutralizes the effect of temperature upon the solvent viscosity or impurity ion mobility so that a measure of difference-conductance at these higher temperatures indicates the acid or base impurity concentration is within a relatively narrow spread.

However, for temperatures farther and farther below 50° C., the solution conductivity changes rapidly with temperature, and consequently a substantial non-linear temperature correction should be applied to the difference-conductance measurements for solution temperatures below 50° C. Circuit arrangements for automatically effecting such correction are later herein described.

Figure 8:
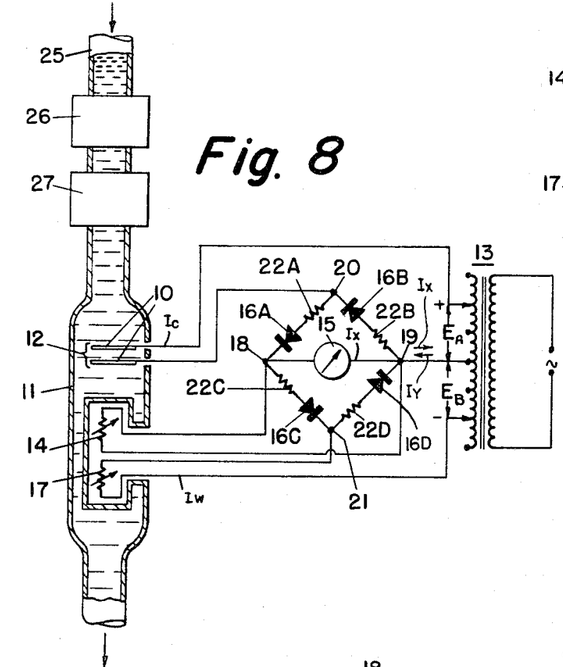
FIG. 8 schematically illustrates a circuit for measuring the conductivity of dilute aqueous solutions in terms of solute concentration or impurity conductivity at a reference temperature.

Referring to FIG. 8, which shows a circuit suitable for measuring the solute-concentration of dilute solutions, the pair of spaced electrodes, 10, 10 within the flow-channel 11 form a conductivity cell 12 traversed by the sample solution. The transformer 13, which may be of the constant voltage type, provides the constant output voltages $E_A$ and $E_B$ as produced, for example, by a tapped secondary or two secondary windings.

During the alternate half-cycles for which the polarities are as indicated in FIG. 8, current flows from the + terminal of source $E_A$ through the cell 12 to the network terminal 20, through resistor 22A, diode 16A, resistor 22C, diode 16C, temperature-sensitive resistor 17 in thermal communication with the sample solution, and thence to the —terminal of source $E_B$. The conductance of the cell 12 is normally greater than that of resistor 17 so that the bridge terminal 18 is more positive than the terminal 19. Hence current will flow between terminals 18, 19 in the parallel paths comprising meter 15 and resistor 14 and thence as current $I_X$ to the common terminal of sources $E_A$, $E_B$. Since bridge terminal 20 is more positive than terminal 19 and since point 21 is made less positive than terminal 19 by selection of the values of the bridge resistors, the diodes 16B, 16D are non-conductive and no current flows in these portions of the circuit.

During the other alternate half-cycles for which the polarities are the reverse of those shown in FIG. 8, current passes through the paths of diodes 16D and 16B while diodes 16A and 16C are non-conductive. With the conductance of cell 12 greater than that of resistor 17, current $I_Y$ flows from the center-tap of the transformer 13 to bridge terminal 19 where it merges with the main current flowing through resistor 22B, diode 16B and cell 12.

The meter 15 responds to the halfwaves which correspond with current $I_X$: no component corresponding to current $I_Y$ passes through the meter. The current $I_X$ represents the difference between the currents $I_C$ and $I_W$ respectively traversing the conductivity cell 12 and the temperature-sensitive resistor 17. Thus, the reading of meter 15 may be made to represent the difference-conductance of the solution at a reference temperature by selecting for resistance 17 a resistor, or network of resistors, whose temperature-coefficient substantially matches that of theoretically pure water.

More specifically, to simulate the ionization/temperature characteristic of theoretically pure water, the required resistance values at different temperatures of resistance means 17 are determined by calculation using Equation 4 below and applying the temperature/conductivity data for theoretically pure water (see Table A above) and values of other components of the circuit of FIG. 8.

(4)  $$R = \frac{E_B K}{E_A G}$$

where $R$ = resistance of means 17 at given temperature
$G$ = specific conductance of theoretically pure water at same temperature
$K$ = cell constant of cell 12
$\left.\begin{array}{l}E_A \\ E_B\end{array}\right\}$ = output voltage of transformer 13

As evident from Equation 4, the values of R must be kept inversely proportional to the specific conductance of pure water but need not be numerically equal to $1/G$ inasmuch as adjustment is afforded in selection of the ratio $E_B/E_A$ and of the cell-constant value K.

Directing attention now to another compensation action of the circuit of FIG. 8, it is to be noted that the resistance means 14, which may be a resistor, or network of resistors, at least in part in thermal transfer with the sample solution and having a temperature-coefficient, is connected in shunt to the meter 15. The purpose of the temperature-sensitive means 14 is to provide conductance-difference readings of meter 15 that are substantially or completely compensated for the effect of temperature upon the solutions. As previously herein mentioned, the conductance of ions of the salt type normally increase about 2% per degree C. Hence, the temperature-coefficient of means 14 is selected to cause a decrease of the sensitivity of indicator 15 with increase in solution temperature and to an extent which offsets the conductance increase of the solute ions. The reading furnished by indicator 15 thus can be calibrated in terms of the conductance of the solute at a reference temperature or directly in terms of solute-concentration. Although the use of a temperature-coefficient of 2% per degree C. will suffice in many cases, even more precise monitoring of a sample solution whose impurity ion species remains the same can be obtained by basing the selection of the resistance/temperature characteristic of means 14 on actual temperature-conductance data obtained on the particular ion species in question.

Figure 10:
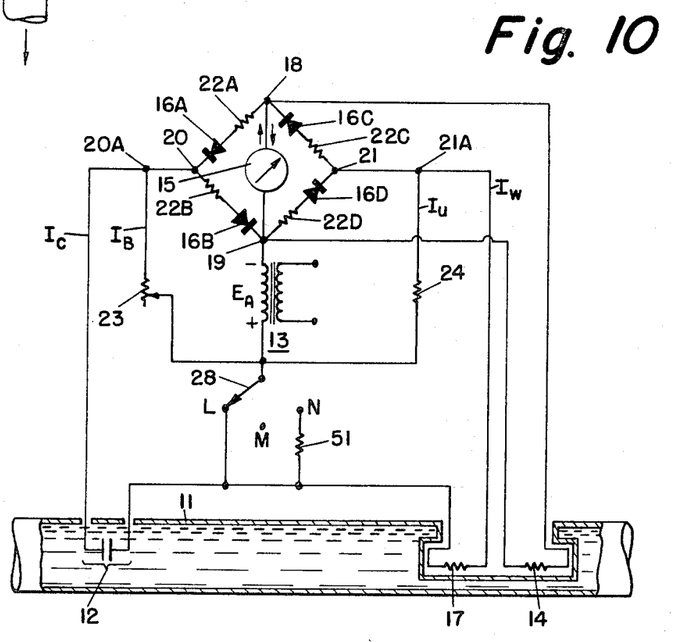
FIG. 10 schematically illustrates a modification of the circuit shown in FIG. 8.

Another circuit suited to measure the solute-concentration of solutions traversing flow-channel 11 is shown in FIG. 10. Components corresponding with those of FIG. 8 are identified by the same reference characters. For purposes of initial adjustment, switch 28 is placed in the open position M, FIG. 10. For the alternate half-waves for which the output voltage $E_A$ of the transformer has the polarity indicated, current $I_U$ flows from the + terminal of source $E_A$ through resistor 24, terminal 21A and 21, resistor 22C, diode 16C, terminal 18, the parallel circuit including resistor 14 and meter 15, terminal 19, and thence back to the negative terminal of source $E_A$. Since the bridge terminal 21 is positive with respect to terminal 19, the diode 16D is non-conductive. Current $I_B$ flows from $+E_A$ through adjustable resistor 23, terminals 20A and 20, resistor 22B, diode 16B and then back to $-E_A$ via bridge terminal 19. Diode 16A is now conductive because bridge terminal 20 is more positive than terminal 18. When the polarity of $E_A$ reverses in the other alternate half-cycles, the current paths externally of the bridge are the same as before but the diode bridge symmetrically reverses with diodes 16A and 16D becoming conductive, and 16B, 16C non-conductive. In consequence, the halfwave DC components flowing through meter 15 as a result of currents $I_B$ and $I_U$ are in opposite directions and the meter 15 indicates any difference in these current values. With the switch 28 still open, the resistor 23 is adjusted until a null reading of meter 15 indicates the circuit is balanced with $I_B$ and $I_U$ equal. The balancing insures that at all times the bridge diodes are operating in favorable regions of their voltage/resistance curves.

To measure solute-concentration, switch 28 is then turned to position L. The AC current $I_C$ flowing through the conductivity cell merges with current $I_B$ at terminal 20A. Since the resistance 23 and the resistance of cell 12 are high compared with the effective resistance of the diode bridge and meter 15, the currents $I_C$ and $I_B$ combine additively at point 20A to give a combined current flowing to point 20 and into the diode bridge. The combined current is the sum of currents $I_C$ and $I_B$ and a halfwave component of it flows through meter 15. Likewise, since the values of resistances 24 and 17 are high compared to that of the diode bridge and meter 15, the current $I_W$ flowing through the compensating resistor 17 additively merges with current $I_U$ and enters the bridge at terminal 21. In consequence, a halfwave component of the summed current $I_W$ and $I_U$ flows through meter 15 and in direction opposite to the halfwave component of the summed currents $I_C$ and $I_B$. The meter automatically subtracts the oppositely flowing currents; and since the circuit has previously been balanced to establish equality of components $I_B$ and $I_U$, the meter indication corresponds to the difference of currents $I_C$ and $I_W$ respectively flowing through cell 12 and the solvent-ion compensating resistor 17.

As previously mentioned in connection with FIG. 8, the resistance means 14 of FIG. 10 is of temperature-variable type and is in thermal communication with the sample solution passing through flow channel 11. The temperature-coefficient of resistor 14 is chosen to change the sensitivity of indicator 15 to compensate for the approximately 2% per degree centigrade rise in conductance of the solute ions with increase of solution/temperature. Specifically, the characteristics of the indicator circuit, which are significantly determined by resistor 14, are so chosen that as the temperature of a given sample solution changes, the product of solute ion conductivity and effective net resistance between bridge points 18 and 19 remains constant. In making such calculation, the temperature-conductance data of the solute ions correspond to the usually encountered case, i.e., where solvent ion contributions are negligible.

The proper characteristics of the compensating means 17 of FIG. 10 are established as already has been described in connection with FIG. 8 except that in this case, because of the identity of the functions $E_A$ and $E_B$, Equation 4 assumes a more restricted form expressed as $$(5) \qquad R = \frac{K}{G}$$

A conductivity measuring circuit such as that of FIGS. 8 or 10 may be regarded as an ohmmeter type circuit. Although there are important cases where it is desired to produce a non-linear response, one of which is later herein discussed, there are numerous cases, including the dilute salt measurements previously discussed, where a linear conductance-current response is desired. To produce a linear response, the voltage across the conductivity cell should remain constant: this condition can be closely approximated by providing that the resistance of the conductivity cell comprises substantially all of the resistance of the measuring path of the circuit. In the circuit of FIG. 10, for example, such path can be traced from transformer source $E_A$ to bridge terminal 19, through meter 15 and its associated shunt 14, terminal 18, resistor 22A, diode 16A, points 20 and 20A, cell 12, and switch 28 via its contact L back to source $E_A$. In this path, the diode bridge and meter circuit constitute the principal resistance in addition to that of cell 12. By keeping the resistance of the bridge and meter elements of the order of a few percent or less, as compared with the resistance of cell 12, a substantially linear response is obtained. Conversely, if the resistance of the bridge and meter circuit elements, or that of an additional series element, is increased in comparison with that of cell 12, then the response of the circuit becomes more and more non-linear.

By way of example, in Table B below are listed suitable circuit parameters and components for the circuit of FIG. 10 to give a substantially linear response as used to measure the impurity-concentration of dilute salt solutions.

TABLE B

Voltage $E_A$—102 volts.
Resistor 23—6000 ohms.
Resistor 24—5000 ohms.
Resistor 22A—20 ohms.
Resistor 22C—20 ohms.
Resistor 22B—120 ohms.
Resistor 22C—120 ohms.
Meter 15 (as shunted by means 14), approximate net resistance—100 ohms.
Diodes 16A, 16B, 16C, 16D—Type 1N816.
Cell 12—Cell constant of 0.1 cm.$^{-1}$.
Means 17—Values established per Equation 5.
Means 14—Temperature-sensitive resistor: selected in combination with associated elements, so that product of the solute ion conductance and effective resistance across bridge terminals 18, 19 remains constant with change in solution temperature.

The measurement systems described above fully and accurately take into account the factors that are encountered in making conductivity measurements on dilute salt solutions, with factors have been discussed in connection with FIG. 3. The seriously interfering effect of the changing conductance of the solvent ions with temperature, as well as the interfering effect of temperature on the solute ions, is completely eliminated from the measurement. The net result is that the instrument indication corresponds to the temperautre-independent dash-dot-dash lines of FIG. 3. Moreover, the indication is linearly proportional to the quantity which is desired to be measured, namely, the concentration of the solute ion. Furthermore, by appplication of actual conductance-difference values as derived from FIG. 3, Table A, or other sources, it is feasible to calibrate the instrument readout directly and reliably in terms of solute salt concentration. The present invention makes it possible, for the first time, to use conductivity to make precise and exact measurement of salt-type impurities present in dilute solutions whose specific conductivity is of the order of 1 micromho per centimeter or less.

As previously mentioned with regard to the common-ion case, some types of sample solutions for one reason or other present complications in the measurement. Specific cases of this kind are now discussed below.

When the solution supplied to the sampling line 25 of FIG. 8 is boiler water which has been pretreated with a basic nitrogen substance such as ammonia or an amine, the conductivity cell 12 may be preceded by the treatment chambers 26 and 27. The first treatment chamber 26 may contain a cation exchange material, such as a sulphonated styrene-divinylbenzene resin. As a specific example, it may contain the acid form of Rohm & Haas resin IR–120, which absorbs the ammonia and amines and converts the impurity salts to acids. The second treatment chamber 27 may contain material to reconvert the impurity substances, now in the form of acids, back into neutral salts either identical or corresponding to the original impurities, thus to eliminate or minimize the cation effect due to the hydrogen ions of the acid. This reversion can be effected in chamber 27 by filling it with a material that will selectively remove hydrogen ions and replace them by other cations. After such treatments in chambers 26 and 27, the sample solution is in neutral salt state and so is suited for determination of its impurity ion concentration by the circuit of FIG. 8 or FIG. 10 as thus far described.

When the solution supplied to the sampling line 25 is steam generated from boiler water which has not been treated with ammonia or amines, only one of the chambers 26, 27 is necessary and it may be in the form of a heat-exchanger or condenser or may comprise a mechanical degassing system to remove residual gases. In such case, the effluent or condensate is a dilute salt solution whose compensated difference-conductance as measured by the circuit of FIG. 8 or FIG. 10 is a reliable measure of steam purity.

When the sample solution from a process is itself acid, its hydrogen ions may be converted to salt impurity ions prior to passage through the conductivity cell 12 by treating it in chamber 27 as previously mentioned. Various methods of removing hydrogen ions by means of insoluble, acid-diminishing substances interposed prior to passage of the solution through the conductivity cell 12 may be used. For example, chamber 12 may be filled with material that reacts with hydrogen ions and replaces them with metal ions, the material alone adding negligible ionizable impurity to the solution. Such material may be any of the numerous oxides and hydroxides which are insoluble in water. In their reaction with excess hydrogen ions, they create a neutral condition in the solution, their oxygen reacting with hydrogen to form water and their metal going into the solution as the ion. Examples of metals having such oxides or hydroxides are: Cu, Be, Al, Sc, Zn, Y, In, La (and other Lanthanides), Ti, Zr, Ge, and Sn. Such material may also be in form other than oxides or hydroxides, for example, insoluble carbonates such as lead carbonate.

Hydrogen ions may also be removed from the sample solution by metals, such as magnesium, zinc or aluminum in their elementary form. Also such metals may be used as supports for holding in chamber 27 thin layers of their insoluble oxides, hydroxides or salts.

Figure 9:
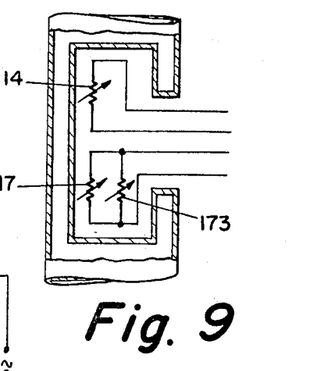
FIG. 9 schematically illustrates a modification of a portion of the circuit of FIGS. 8, 10 and 12.

The circuit modification of FIG. 9 is useful in cases when it is desired to eliminate a small background conductance effect in addition to that arising from the solvent ions. Such a case may arise, for example, in the pretreatment of the sample solution as previoulsy described in discussion of FIG. 8 or FIG. 10. For instance, if calcium or strontium carbonate is selected for reaction with excess hydrogen ions in solution to obtain a buffering action, the small background conductance due to the slight solubility of the carbonate can be eliminated from the meter reading by having the temperature characteristic of resistance means 173 match the conductance effect of the carbonate at the various temperatures of operation.

Reverting to the problem of determining the salt impurities of water which have been treated with ammonia or amines, instead of using acid-forming ion-exchange material in chamber 26 to absorb the amines, there may be used an activated form of carbon, alumina or silica which effects such absorption without forming acids and leaving the original salt impurities unaffected. In this case, the effluent from chamber 26 may pass directly to the flow-channel 11 of cell 12 with chamber 27 omitted.

For measurement of steam purity, such non-acid-forming sorbent column may be used as chamber 27 preceded by chamber 26 in the form of a condenser with provision for removal of carbon dioxide and other volatile impurities. In such case, the amines in the condensate are removed by the sorbent material in chamber 27 and the effluent therefrom containing only the salt impurity ions passes to the flow-channel 11.

Still another way of determining the salt impurities of water that has been treated with ammonia or amines is to use for the chambers 26, 27 a combination of units comprising a mechanical degasser and an ion exchanger with a resin of the styrene-divinylbenzene type preceded by suitable cooling means. The initial degasser, which may be in the form of a vented condenser, removes nearly all gas including acidic gas such as carbon dioxide. The ion exchanger removes ammonia and amines and converts solute cations into hydrogen ions. Before leading the treated solution into flow-channel 11, the solution may be optionally treated by a second degassing unit which causes reboiling of the solution and strips from it any carbonic acid derived from carbonates originally present in the sample. The solute constituents now in the form of acids in the solution in channel 11 are estimated by applying a conductivity measurement with the circuit of FIG. 8 or FIG. 10. In this case, with the solute now in the form of acid, one of the solute ions will be present in common with one of the solvent ions. The measurement problem is now different from the salt case and has been discussed in connection with FIGS. 4 to 7.

When a common-ion is present, as with hydrochloric acid or sodium hydroxide solutions, the ohmmeter circuit of FIG. 8 or FIG. 10 may be either the linear type or the non-linear type, with the same solvent ion compensator 17 as for neutral salt solutions. With the linear ohmmeter circuit, the residual error caused by the common ion effect may be partially corrected by selecting for compensator 14 a resistance or resistance network whose temperature-coefficient matches the average temperature-coefficient of the solution within the dilute concentration range. The curves $X_{1C}$ to $X_{4C}$ of FIG. 7 are indicative of the reproducible correlation between the acid ion concentration and solution-conductivity as corrected in this manner. With the linear circuit, more exact temperature-compensation for the solute ions and for the repressive common-ion effect is impractical because the conductance is dependent upon solution-concentration as well as solution temperature. However, such residual error may be further reduced by using the non-linear ohmmeter circuit and utilizing its non-linearity to offset the non-linearity of the difference-conductance $L_{1C}$ to $L_{4C}$ (FIG. 7) which is due in part to the common-ion effect. The circuit of FIG. 10 can be readily modified to produce a non-linear response by turning switch 28 from position L to position N so to introduce resistor 51 into the measurement circuit path.

Table C below provides a comparison of the overall compensation for both types of circuits and shows the further substantial improvement obtained with the non-linear circuit. The data of Table C represent the response of the circuit of FIG. 10 with components as set forth in Table B except that the networks comprising meter 15 and resistor 14 for the two types of operation respectively have values with change in temperature as indicated in Table D and resistor 51 has a value of 10,000 ohms.

TABLE C.—LINEAR CIRCUIT

| HCl Concentration, N ($\times 10^6$) | Temp., °C. | Difference Current, ma. | Instrument Response [1] | Q [2] | Q as Percent [3] |
|---|---|---|---|---|---|
| 0.2 | 0 | 0.044 | 0.0080 | 0.040 | 91 |
|  | 25 | 0.053 | 0.0065 | 0.032 | 72 |
|  | 50 | 0.055 | 0.0055 | 0.028 | 63 |
|  | 75 | 0.059 | 0.0055 | 0.028 | 63 |
|  | 100 | 0.065 | 0.0058 | 0.029 | 66 |
| 0.5 | 0 | 0.123 | 0.0222 | 0.0444 | 101 |
|  | 25 | 0.168 | 0.0205 | 0.0410 | 94 |
|  | 50 | 0.181 | 0.0181 | 0.0362 | 83 |
|  | 75 | 0.180 | 0.0167 | 0.0334 | 76 |
|  | 100 | 0.184 | 0.0164 | 0.0328 | 75 |
| 1.0 | 0 | 0.255 | 0.0461 | 0.0461 | 105 |
|  | 25 | 0.375 | 0.0458 | 0.0458 | 105 |
|  | 50 | 0.438 | 0.0438 | 0.0438 | 100 |
|  | 75 | 0.448 | 0.0415 | 0.0415 | 95 |
|  | 100 | 0.443 | 0.0395 | 0.0395 | 90 |
| 2.0 | 0 | 0.521 | 0.0942 | 0.0471 | 107 |
|  | 25 | 0.797 | 0.0973 | 0.0486 | 111 |
|  | 50 | 0.992 | 0.0992 | 0.0496 | 113 |
|  | 75 | 1.076 | 0.0997 | 0.0499 | 114 |
|  | 100 | 1.092 | 0.0973 | 0.0486 | 111 |
| 8.0 | 0 | 2.117 | 0.382 | 0.0478 | 109 |
|  | 25 | 3.344 | 0.407 | 0.0509 | 116 |
|  | 50 | 4.410 | 0.441 | 0.0551 | 126 |
|  | 75 | 5.220 | 0.484 | 0.0605 | 138 |
|  | 100 | 5.762 | 0.513 | 0.0642 | 147 |
| 0.2 | 0 | 0.0436 | 0.00728 | 0.0364 | 91 |
|  | 25 | 0.0520 | 0.00619 | 0.0310 | 75 |
|  | 50 | 0.0528 | 0.00544 | 0.0272 | 68 |
|  | 75 | 0.0546 | 0.00546 | 0.0273 | 68 |
|  | 100 | 0.0557 | 0.00557 | 0.0279 | 70 |
| 0.5 | 0 | 0.121 | 0.0202 | 0.0404 | 101 |
|  | 25 | 0.163 | 0.0194 | 0.0388 | 97 |
|  | 50 | 0.172 | 0.0177 | 0.0354 | 89 |
|  | 75 | 0.164 | 0.0164 | 0.0328 | 82 |
|  | 100 | 0.157 | 0.0157 | 0.0314 | 79 |
| 1.0 | 0 | 0.248 | 0.0414 | 0.0414 | 104 |
|  | 25 | 0.358 | 0.0426 | 0.0426 | 107 |
|  | 50 | 0.406 | 0.0418 | 0.0418 | 105 |
|  | 75 | 0.398 | +0.0398 | 0.0398 | 100 |
|  | 100 | 0.370 | 0.0370 | 0.0370 | 93 |
| 2.0 | 0 | 0.494 | 0.0825 | 0.0413 | 103 |
|  | 25 | 0.731 | 0.0870 | 0.0436 | 109 |
|  | 50 | 0.874 | 0.0900 | 0.0450 | 113 |
|  | 75 | 0.905 | 0.0905 | 0.0452 | 113 |
|  | 100 | 0.864 | 0.0864 | 0.0432 | 108 |
| 8.0 | 0 | 1.744 | 0.291 | 0.0364 | 91 |
|  | 25 | 2.486 | 0.296 | 0.0370 | 93 |
|  | 50 | 2.985 | 0.308 | 0.0385 | 96 |
|  | 75 | 3.252 | 0.325 | 0.0406 | 101 |
|  | 100 | 3.330 | 0.333 | 0.0416 | 104 |

[1] Volts as measured across points 18 and 19 of circuit of Fig. 10 (see Table D).
[2] Instrument response expressed per unit of HCl concentration, obtained by dividing the instrument response figure by the microconcentration value.
[3] 100×Q divided by a mid-value of Q (the divisor was 0.0438 for the linear circuit, and 0.0400 for the nonlinear circuit).

TABLE D.—EFFECTIVE RESISTANCE IN OHMS BETWEEN POINTS 18 AND 19

| Type of Circuit Operation | Temperature in Degrees C. | | | | |
|---|---|---|---|---|---|
|  | 0 | 25 | 50 | 75 | 100 |
| Linear | 180.6 | 122.0 | 100.0 | 92.7 | 89.1 |
| Non-Linear | 167.0 | 119.0 | 103.0 | 100.0 | 100.0 |

Figure 11:
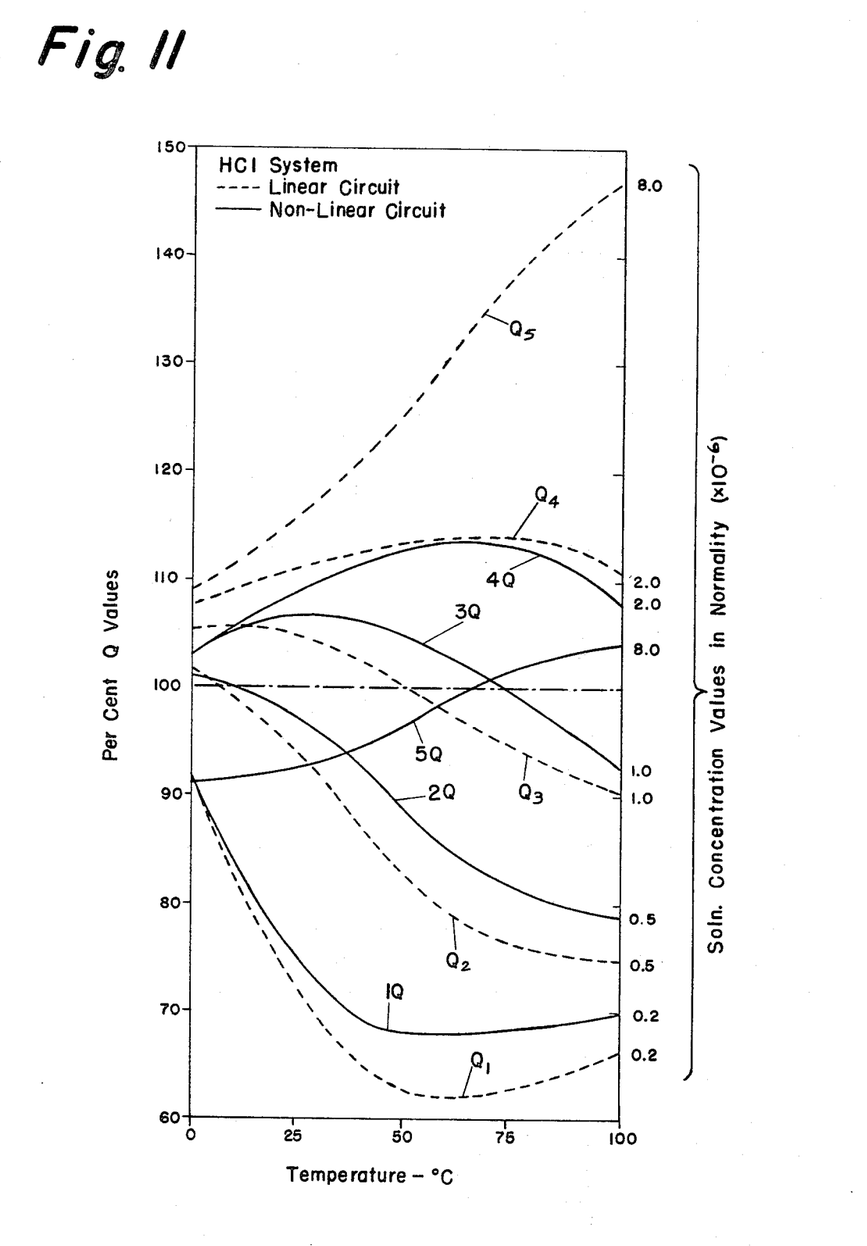
FIG. 11 is an explanatory figure referred to in discussion of FIGS. 8, 10 and 11.

In Table C, the instrument response factor of column 4 is the voltage appearing across points 18, 19 of FIG. 10. The Q function (column 5) of Table C is obtained by dividing the instrument response by the corresponding solution normality (expressed in microunits) and so shows both the temperature compensation and the concentration linearity of the instrument response. In column 6 of Table C, the Q values are expressed as percent, based on an appropriate mid-value of Q, to permit direct comparison of the two types of circuit operation. The percent Q values for the linear ohmmeter circuit are plotted as the dash-line curves of Q1–Q5 of FIG. 11 and the percent Q values for the non-linear ohmmeter circuit are plotted as the full-line curves 1Q–5Q of FIG. 11. It is to be noted that the percent Q curves for the non-linear circuit are more closely bunched which is indicative of smaller percentage error with change of concentration. Attention is particularly directed to the two pairs of curves Q5–5Q indicating the very substantial reduction in percentage error attained with the non-linear circuit for higher acid concentrations. This is of importance because a large percentage error in measurement of a more concentrated solution is of much greater consequence than the same percentage error of a very low concentration solution.

It is to be understood that the linear and non-linear circuits of FIG. 10 can be similarly applied to common-ion cases where the solute is an acid other than hydrochloric acid or where it is a base such as sodium hydroxide. When applying the circuit of FIG. 10 to a common-ion solute other than hydrochloric acid, some small adjustment of circuit parameters relating to resistors 14 and 51 may be helpful in achieving optimization of response to the new solute impurity. The procedure is the same as with the hydrochloric example; namely, to make a series of calculations using different assumed values of the parameters and to select from the results the best fit with the conductivity data of Table A or as may be obtained from other sources.

Figure 12:
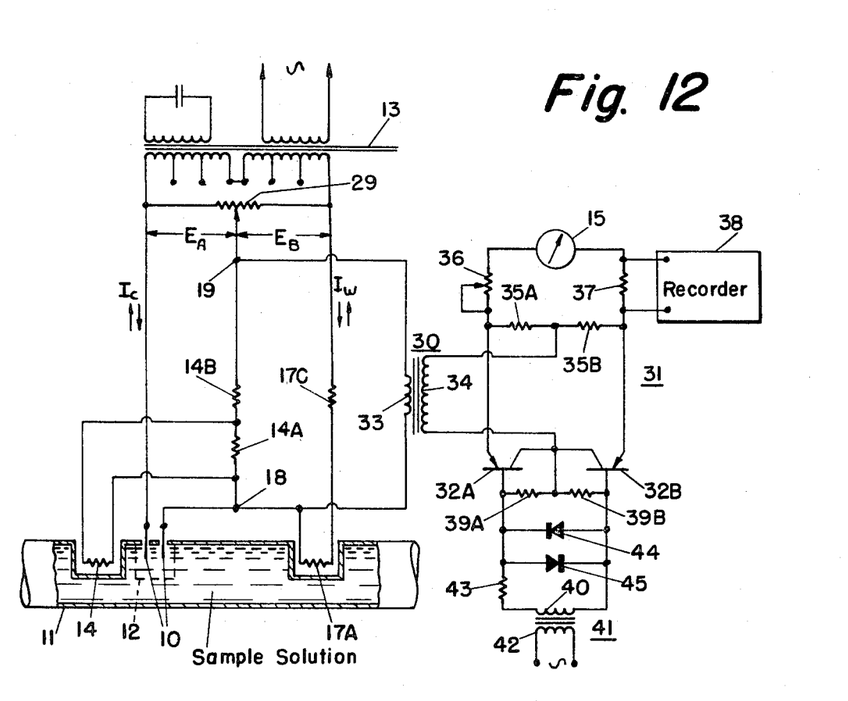
FIG. 12 schematically illustrates a second modification of the circuit shown in FIG. 8.

The conductivity measuring system shown in FIG. 12 is basically the same as that of FIG. 8 or FIG. 10 with corresponding elements identified by similar reference characters. In all three figures, the signal voltage applied to the meter is proportional to the difference between the cell current $I_C$ and the solvent-compensated current $I_W$: in FIG. 12, however, the circuitry for connecting the meter 15 to the measuring resistance means and for isolating it from alternating current is that disclosed and claimed in U.S. Letters Patent 3,086,169.

Briefly, the terminals 18, 19 of the measuring resistance means including the resistors 14, 14A, 14B are coupled by signal transformer 30 to a balanced demodulator network 31 including the transistors 32A, 32B. The collectors of the transistors are connected together and to one terminal of the output winding 34 of the signal transformer. The other terminal of output winding 34 is connected to the junction of equal valued resistors 35A, 35B which are connected in series between the emitter electrodes of transistors 32A, 32B. The AC voltage drop across the measuring resistance means in the conductvity measuring circuit is thus applied to the emitter-collector circuits of both transistors of the demodulator circuit 31.

The resistors 39A, 39B respectively in the base-collector circuits of the transistors 32A, 32B are connected in series across the output winding 40 of power transformer 41. The resistor 43 and the reversely-poled diodes 44, 45 limit the base-collector bias of the transistors. The primary 42 of the transformer 41 is excited from the same AC source as transformer 13. The meter 15 is connected across resistors 35A, 35B in series with calibrating rheostat 36 and, if desired, with a coupling resistor 37 to provide an input signal for a recorder 38.

The resistance of the demodulator circuit as seen by the signal transformer 30 is reflected back into the conductivity measuring circuit as a component of the measuring resistance means $R_M$ between terminals 18, 19 of the conductivity measuring circuit and so should be taken in account in selection of the value of such resistance means and its temperature-coefficient of resistance. For the purpose of measuring water impurity concentrations corresponding with conductances in the range from about 0 to about 1 micromho per centimeter, suitable components and circuit parameters of the conductivity measuring circuit of FIG. 12 are listed below.

TABLE E

Transformers:
    13 — Self - regulating
        transformer _______ 40 volt secondary.
    30 — Signal transform-
        er _______________ 1 to 1 turns ratio.
    41 — Power transform-
        er _______________ 3.15 volt secondary.

Meter:
    15—100 microamperes meter.

Water-ionization compensator:
    17A—Thermistor ____ Res. 101.3 K. at 37.8 ° C.:
                              Neg. Temp. coefficient.
    17C—5000 ohms ____ 1%.

Solute compensator and measuring resistance:
    14B—60 ohms_______ 1%.
    14A—1200 ohms ____ 1%.
    14—Thermistor ______ Res. 78 ohms at 37.8 ° C.:
                              Neg. Temp. coefficient.

Conductivity cell:
    12—0.01 cell constant.

Zero adjustment:
    29—200 ohms.

The scale of the meter 15 of FIG. 12 as well as that of FIG. 8 or FIG. 10 may be calibrated in units indicative of the solute-concentration or solute specific conductivity at a selected reference temperature. The circuit constants of Table E for FIG. 12 provide for reading of solute specific conductance at a reference temperature of 25° C. This instrument is particularly intended for use in atomic energy installations, supercritical steam power plants, transistor manufacturing installations, and other service or manufacturing facilities using very pure water in large quantities and requiring rapid determination of water-purity under varying temperature conditions.

It will be understood that as in FIG. 8 or FIG. 10 the solvent compensator resistor may be shunted by another resistor to compensate for background conductance due to another species of ion, as discussed in connection with FIG. 9, and that the solute compensator network 14, 14A, 14B may, for more accurate measurements of strong acid or base solutions, be replaced by a network whose temperature-conductance coefficient still more closely matches the combined effects of temperature and concentration upon the difference-conductance. As shown by curves $L_{1C}$–$L_{4C}$ of FIG. 7, the conductance of acid or base solutions exhibit a large change in resistance at lower temperatures but approach constancy at higher temperatures. The meter reading can be compensated for by using for the measuring resistance means a resistive element having a negative temperature-coefficient of resistance, such as a varistor or thermistor in series with a fixed resistor: at the lower temperatures, the effect of the temperature-sensitive resistor dominates, but at higher temperatures, its resistance is small compared to the value of the fixed resistance so affording the type compensation required as indicated in Table D. The same type of temperature-coefficient for the measuring resistance means can be obtained with a parallel circuit comprising a fixed resistance and a temperature-sensitive resistor, such as a carbon resistor, having a positive temperature-coefficient of resistance.

What is claimed is:

1. A method of measuring the solute-concentration of a dilute aqueous solution having a specific conductivity of the order of 1 micromho per centimeter or less which comprises producing flow through said solution of a first current whose magnitude varies with change in solution-conductance, producing flow through solvent-ion compensating resistance means of a second current whose magnitude varies non-linearly with change in solution temperature in accordance with the calculated ionization/temperature characteristic of theoretically pure water, and effecting subtraction of said first and second currents in a measuring circuit to produce a difference-current representative of the solute-concentration at the existing solution temperature.

2. A method of measuring the solute-concentration of a dilute aqueous solution having a specific conductivity of the order of 1 micromho per centimeter or less which comprises producing flow through said solution of a first current whose magnitude varies with change in solution-conductance, producing flow through solvent-ion compensating resistance means of a second current whose magnitude varies non-linearly with change in solution temperature in accordance with the calculated ionization/temperature characteristic of theoretically pure water, effecting subtraction of said first and second currents in a measuring circuit to produce a difference-current representative of the solute-concentration at the existing solution temperature, modifying the magnitude of said difference-current to an extent corresponding with the difference between the existing solution temperature and a reference temperature and substantially in accordance with the effects of solution-concentration and of temperature upon mobility of the solute ions in water, and measuring the modified difference-current as an index of solute-conductance at the reference temperature.

3. A method of measuring the concentration of salt impurities in a dilute aqueous solution having a specific conductivity of the order of 1 micromho per centimeter or less which comprises producing flow through said solution of a first current whose magnitude varies with change of solution-conductance, producing flow through solvent-ion compensating resistance means of a second current whose magnitude varies non-linearly with change in solution temperature in accordance with the calculated ionization/temperature characteristic of theoretically pure water, effecting subtraction of said first and second currents in a measuring circuit to produce a difference-current representative of the salt concentration at the existing solution temperature, modifying the magnitude of said difference-current to an extent corresponding with the difference between the existing solution temperature and a reference temperature and linearly at a rate of about 2% per degree centigrade, and measuring the modified difference-current in terms of salt conductance at the reference temperature.

4. A method of determining the concentration of neutral salt impurities in an aqueous solution having a conductivity of the order of 1 micromho per centimeter or less and pretreated with material imparting a small reproducible conductance effect which comprises producing flow through said solution of a first current whose magnitude varies with the conductivity of said solution, producing flow through solvent-ion compensating resistance means of a second current whose magnitude varies non-linearly with the solution temperature substantially in accordance with the calculated ionization/temperature characteristic of theoretically pure water, increasing the magnitude of said second current to an extent at least approximately corresponding to that fraction of the first current due to the ion contribution of said pretreating material, modifying the difference between said first current and the increased second current linearly at a rate of approximately 2% per degree centigrade in accordance with the difference between the solution temperature and a selected reference temperature to produce a difference-current substantially compensated for the ion contribution of pure water and of the pretreatment material, and measuring said difference-current as an index of the conductance of neutral salt impurities at the reference temperature.

5. A method of monitoring the concentration of soluble salt impurities in effluent water, as from a boiler, ion-exchange bed and the like, and pretreated with material such as ammonia and amines which comprises treating the effluent water by a cation exchanger which removes the ammonia and amines and converts the salt impurities to acid impurities, converting said acid impurities to neutral salt form to transform the treated effluent water to an essentially neutral aqueous solution containing soluble salt impurities, producing flow through said solution of a first current whose magnitude varies with the conductance of said solution, producing flow through solvent-ion compensating resistance means of a second current whose magnitude varies non-linearly with the solution temperature and in accordance with the rapidly rising calculated ionization/temperature characteristic of theoretically pure water, combining said currents to produce a difference-current corresponding with the salt concentration at the solution temperature, modifying said difference-current linearly at a rate of approximately 2% per degree centigrade in accordance with the difference between said solution temperature and a selected reference temperature, and measuring said modified difference-current as an index of the purity of said effluent water.

6. A method of monitoring the concentration of soluble salt impurities in effluent water, as from boilers, ion-exchange beds and the like, and pretreated with material such as ammonia and amines which comprises treating the effluent water by a cation exchanger which removes the ammonia and amines and converts the salt impurities to acid impurities, treating the resultant solution of water and acid impurities with material reacting with hydrogen ions to replace them by an insoluble metal ion reacting with excess hydrogen ions to produce neutrality of the solution, producing flow through the treated solution of a first current whose magnitude varies with the conductance of the treated solution, producing flow through solvent-ion compensating resistance means of a current whose magnitude varies non-linearly with the treated solution temperature substantially in accordance with the calculated ionization/temperature characteristic of theoretically pure water, combining said first and second currents to produce a difference-current corresponding with salt concentration at the existing temperature of the treated solution, modifying said difference-current linearly at a rate of approximately 2% per degree centrigrade in accordance with the difference between the treated solution temperature and a selected reference temperature, and measuring said modified difference-current as an index of the purity of said effluent water.

7. A method of monitoring the concentration of soluble impurities in effluent water, as from boilers, ion-exchange beds and the like, which comprises treating the effluent water to replace hydrogen ions of any strong acids present in the effluent water by reacting the effluent water with an insoluble substance selected to replace hydrogen ions with metal ions to produce neutrality of the treated effluent water, producing flow through the treated effluent water a first current whose magnitude varies with the conductance of the treated effluent water, producing flow through solvent ion compensating resistance means of a second current whose magnitude varies non-linearly with the temperature of the treated effluent water substantially in accordance with the calculated ionization/temperature characteristic of theoretically pure water, combining said first and second currents to produce a difference-current corresponding with salt concentration at the existing temperature of the treated solution, modifying said difference-current linearly at a rate of 2% per degree centigrade in accordance with the difference between the treated solution temperature and a selected reference temperature, and measuring said modified difference-current as an index of the purity of said effluent water.

8. A method of monitoring the concentration of soluble salt impurities in effluent water, as from a boiler, ion-exchange bed and the like, containing a basic nitrogen substance which comprises treating the effluent water selectively to remove the basic nitrogen substance without appreciably affecting the salt impurities, producing flow through the treated effluent water of a first current whose magnitude varies with the conductance of said treated water, producing flow through solvent-ion compensating resistance means of a second current whose magnitude varies non-linearly with the temperature of said treated water substantially in accordance with the calculated ionization/temperature characteristic of theoretically pure water, combining said first and second currents to produce a difference-current corresponding with the salt concentration at the temperature of the treated water.

modifying said difference-current linearly at a rate of approximately 2% per degree centigrade in accordance with the difference between said solution temperature and a selected reference temperature, and measuring said modified difference-current as an index of the purity of said effluent water.

9. A method of determining the purity of steam produced from amine-treated water which comprises condensing the steam for removal of volatile impurities including carbon dioxide, removing amines from the resulting condensate, producing flow through the amine-free condensate of a first current whose magnitude varies with the conductivity of said solution, producing flow through solvent-ion compensating resistance means of a second current whose magnitude varies non-linearly with the condensate temperature substantially in accordance with the calculated ionization/temperature characteristic of theoretically pure water, combining said first and second currents to produce a difference-current corresponding with the concentration of impurities at the temperature of the condensate, modifying said difference-current linearly at a rate of approximately 2% per degree centigrade in accordance with the difference between the condensate temperature and a selected reference temperature, and measuring said modified difference-current as an index of steam purity.

10. A method of monitoring the concentration of acid or base impurities in an aqueous solution having a conductivity of the order of 1 micromho per centimeter or less which comprises producing by flow of current through said solution a first voltage whose magnitude varies with the conductivity of said solution, producing by flow of current through solvent-ion compensating resistance means a second voltage whose magnitude varies non-linearly with the solution temperature substantially in accordance with the calculated ionization/temperature characteristic of theoretically pure water, opposing said first and second voltages to produce a resultant difference-voltage, modifying said resultant difference-voltage to an extent corresponding with the difference between the solution temperature and a selected reference temperature and substantially in accordance with the joint effect of solution temperature and concentration upon solution-conductance as affected by the common ion effect, and measuring said modified difference-voltage as an index of the conductance of the acid or base impurities at the reference temperature.

11. A method of monitoring the concentration of acid or base impurities in an aqueous solution having a conductivity of the order of 1 micromho per centimeter or less which comprises producing flow through said solution of a first current whose magnitude varies with the conductivity of said solution, producing flow through solvent-ion compensating means a second current whose magnitude varies non-linearly with the temperature of said solution in accordance with the calculated ionization/temperature characteristic of theoretically pure water, producing a difference current by subtracting in a measuring network the effect of the second from the first of said currents, producing a voltage effect from flow of said difference current through resistance means of said measuring network, modifying said resistance means with changes of solution temperature to maintain substantial constancy of the product of solution-conductance and the resistance of said means for each solution-concentration, and measuring the resulting voltage effect as an index of the concentration of acid or base impurity.

12. A system for measuring the solute-concentration of dilute aqueous solutions comprising a conductivity cell, measurement resistance means in circuit with said cell and a source of constant AC voltage, a meter calibrated in units definitive of solute-concentration and connected for response to the voltage drop across said measurement resistance means, and a second resistance means in circuit with said measurement resistance means, said second resistance means being exposed to solution-temperature and having a non-linear temperature-conductance characteristic matching that of theoretically pure water and connected effectively to subtract from the meter readings the solution-conductivity component due to the hydrogen and hydroxyl ions of the water at the existing solution-temperature.

13. A system for measuring the solute-concentration of dilute aqueous solutions comprising
a conductivity cell,
measurement resistance means in series with said cell and a source of constant AC voltage to form an ohmmeter circuit,
a meter calibrated in units definitive of solute-concentration and connected for response to the voltage drop across said measurement resistance means, and
a second resistance means in circuit with said measurement resistance means, said second resistance means being exposed to solution-temperature and having a non-linear temperature-conductance characteristic matching that of theoretically pure water and connected effectively to subtract from the meter readings the solution-conductivity component due to the hydrogen and hydroxyl ions of the water at the existing solution temperature, and said measuring resistance means being at least in part exposed to solution-temperature and having a temperature-conductance characteristic compensatory of the effect of solution temperature and concentration of the solute-ion component of the solution-conductance.

14. A system for measuring the salt concentration of dilute aqueous solutions comprising
a conductivity cell,
measurement resistance means in series with said cell and a source of constant AC voltage to form a linear ohmmeter circuit,
a meter calibrated in units definitive of salt concentration and connected for response to the voltage drop across said measurement resistance means, and
a second resistance means in circuit with said measurement resistance means, said second resistance means being exposed at least in part to solution temperature and having a non-linear temperature-conductance characteristic matching that of theoretically pure water effectively to subtract from the meter readings the solution-conductivity component due to the hydrogen and hydroxyl ions of pure water at the existing solution temperature, and said measurement resistance means being exposed at least in part to solution temperature and having a negative temperature-conductance characteristic of about 2% per degree centigrade in compensation for the increase with temperature of the salt-ion component of the solution-conductance.

15. A system for measuring the acid or base solute-concentration of dilute aqueous solutions comprising
a conductivity cell,
measurement resistance means in circuit with said cell and a source of constant AC voltage to form an ohmmeter circuit,
a meter calibrated in units definitive of acid or base concentration and connected for response to the voltage drop across said measurement resistance means, and
a second resistance means in circuit with said measurement resistance means, said second resistance means being exposed to solution-temperature and having a non-linear temperature-conductance characteristic matching that of theoretically pure water and connected effectively to subtract from the meter readings the solution-conductivity component due to hydrogen and hydroxyl ions of the water at the existing solution-temperature, and said measurement resistance means including fixed resistance and temperature-sensitive resistance exposed to the solution temperature to impart to said measurement resistance means a temperature-conductance characteristic compensatory of the effect of ions common to the solute and solvent.

16. A system for measuring the acid or base solute-concentration of dilute aqueous solutions comprising
a conductivity cell,
measurement resistance means in circuit with said cell and a source of constant AC voltage to form a non-linear ohmmeter circuit,
a meter calibrated in units definitive of acid or base concentration and connected for response to the voltage drop across said measurement resistance means, and
a second resistance means in circuit with said measurement resistance means, said second resistance means being exposed to solution temperature and having a non-linear temperature-conductance characteristic matching that of theoretically pure water and connected effectively to subtract from the meter readings the solution-conductivity component due to hydrogen and hydroxyl ions of the water at the existing solution temperature; said measurement resistance means including fixed resistance, and temperature-sensitive resistance exposed to the solution temperature to impart to said measurement resistance means a temperature-conductance characteristic compensatory of the combined temperature effects arising from the solute ion change of conductance with temperature and from the change in the number of solvent ions caused by the common ion effect.

17. A system for measuring the salt concentration of dilute aqueous solutions pretreated with material such as ammonia or amines comprising
a conductivity cell,
at least one solution treatment chamber in advance of said cell for effective removal of said pretreatment material,
measurement resistance means in circuit with said cell and a source of constant AC voltage to form an ohmmeter circuit,
a meter calibrated in units definitive of salt concentration and connected for response to the voltage drop across said measurement resistance means, and
a second resistance means in circuit with said resistance means, said second resistance means being exposed at least in part to solution temperature, having a non-linear temperature-conductance characteristic matching that of theoretically pure water and connected effectively to subtract from the meter readings the solution-conductivity component due to hydrogen and hydroxyl ions of pure water at the existing solution temperature, and said measurement resistance means being exposed at least in part to solution temperature and having a negative temperature-conductance characteristic of about 2% per degree centigrade in compensation for the salt-ion component of the solution-conductance.

18. A system suited for measuring the solute-concentration of dilute aqueous solutions having a specific conductivity of the order of 1 micromho per centimeter or less comprising
a diode bridge,
a conductivity cell connected in series with a source of constant AC voltage to one pair of terminals of said bridge,
resistance means exposed at least in part to solution temperature and connected in series with an opposing source of constant AC voltage to the other pair of terminals of said bridge, said resistance means having a non-linear temperature-conductance characteristic matching that of theoretically pure water,
a meter connected for response to the voltage between the two bridge terminals, one common to said sources and the other opposite thereto, and
a second resistance means in shunt to said meter, at least in part exposed to the solution temperature, and having a temperature-coefficient compensatory of the changes of solute conductivity with changes of temperature.

19. A system suited for measuring the solute-concentration of dilute aqueous solutions having a specific conductivity of the order of 1 micromho per centimeter or less comprising
a diode bridge,
a meter connected between one pair of opposite terminals of said bridge,
compensating resistance means in shunt to said meter, at least in part exposed to solution temperature, and having a temperature-coefficient compensatory of the changes of solute conductivity with changes of temperature,
a source of constant AC voltage having one terminal connected to one of said first pair of bridge terminals,
a pair of resistances having a common terminal connected to the other terminal of said voltage source and having their other terminals respectively connected to the other pair of opposite terminals of said bridge, at least one of said resistances being adjustable for pre-balancing of the bridge,
a conductivity cell for connection in shunt to one of said resistances, and
a second compensating resistance means in shunt to the other of said resistances, said second compensating resistance means being at least in part exposed to the solution temperature, and having a non-linear temperature-conductance characteristic matching that of theoretically pure water.

20. A system for measuring the solute-concentration of dilute aqueous solutions having a specific conductivity of the order of 1 micromho per centimeter or less comprising
a conductivity cell,
a first resistance means exposed to solution temperature and connected in series with said cell and a first source of constant AC voltage,
a second resistance means exposed to solution temperature and connected in series with said first resistance means and a second opposed source of AC voltage, said second resistance means having a non-linear temperature-conductance characteristic matching that of theoretically pure water, and said first resistance means having a temperature-coefficient at least approximately matching that of the difference-conductance,
a balanced demodulator having two input circuits and an output circuit,
a meter in said output circuit and calibrated in units definitive of solute-concentration,
a signal transformer having a primary winding connected across said first resistance means and a secondary winding connected to one of said demodulator input circuits, and
means for applying to the other demodulator input circuit a third AC voltage derived from the same source as said first two opposed AC voltages.

References Cited

UNITED STATES PATENTS

| 2,046,583 | 7/1936 | Rummel | 324—30 X |
| 3,086,169 | 4/1963 | Eynon | 324—30 |
| 3,158,444 | 11/1964 | Larson et al. | 23—230 |

FOREIGN PATENTS 464,902   4/1937   Great Britain.

JOSEPH SCOVRONEK, *Primary Examiner.*